(12) United States Patent
Zhu et al.

(10) Patent No.: US 11,027,992 B2
(45) Date of Patent: Jun. 8, 2021

(54) IRON-BASED AMORPHOUS ELECTRODE MATERIAL FOR WASTEWATER TREATMENT AND USE THEREOF

(71) Applicant: Institute of Metal Research, Chinese Academy of Sciences, Shenyang (CN)

(72) Inventors: Zhengwang Zhu, Shenyang (CN); Xindong Qin, Shenyang (CN); Haifeng Zhang, Shenyang (CN); Aimin Wang, Shenyang (CN)

(*) Notice: Subject to any disclaimer, the term of this patent is extended or adjusted under 35 U.S.C. 154(b) by 50 days.

(21) Appl. No.: 16/309,309

(22) PCT Filed: Mar. 10, 2017

(86) PCT No.: PCT/CN2017/000224
§ 371 (c)(1),
(2) Date: Dec. 12, 2018

(87) PCT Pub. No.: WO2018/000795
PCT Pub. Date: Jan. 4, 2018

(65) Prior Publication Data
US 2019/0308891 A1 Oct. 10, 2019

(30) Foreign Application Priority Data

Jun. 29, 2016 (CN) .......................... 201610489617.3
Jul. 18, 2016 (CN) .......................... 201610569480.2

(51) Int. Cl.
| | | |
|---|---|---|
| *C02F 1/467* | (2006.01) | |
| *C22C 45/02* | (2006.01) | |
| *C25B 11/04* | (2021.01) | |
| *C02F 1/461* | (2006.01) | |
| *C02F 101/30* | (2006.01) | |

(52) U.S. Cl.
CPC .............. *C02F 1/467* (2013.01); *C22C 45/02* (2013.01); *C25B 11/04* (2013.01); *C02F 2001/46133* (2013.01); *C02F 2001/46161* (2013.01); *C02F 2101/308* (2013.01); *C02F 2201/46135* (2013.01)

(58) Field of Classification Search
CPC ................. C02F 1/461–4678; C02F 2101/308
See application file for complete search history.

(56) References Cited

U.S. PATENT DOCUMENTS

| | | | | | |
|---|---|---|---|---|---|
| 3,856,513 | A | * | 12/1974 | Chen .................... | B22D 11/005 148/403 |
| 4,036,638 | A | * | 7/1977 | Ray ....................... | C22C 45/008 148/304 |
| 4,264,358 | A | * | 4/1981 | Johnson .................... | C22F 1/18 148/403 |
| 4,339,270 | A | * | 7/1982 | Hashimoto ........... | C22C 45/003 148/403 |
| 4,560,454 | A | * | 12/1985 | Harris ................. | C02F 1/46109 148/403 |
| 4,609,442 | A | * | 9/1986 | Tenhover ............ | C25B 11/0447 205/474 |

FOREIGN PATENT DOCUMENTS

CN 102070236 A * 5/2011

OTHER PUBLICATIONS

Pan et al. "Catalytic oxidation of phenol in wastewater—Anew application of the amorphous Fe78Si9B13 alloy" Chinese Science Bulletin: Progress of Projects Supported by NSFC Materials Science. Jan. 2012 vol. 57, No. 1. pp. 33-40 (Year: 2012).*
"Manufacture of Amorphous Alloy Ribbons" IEEE Transactions on Magnetics. vol. MAG-15, No. 6. Nov. 1979—pp. 1393-1397 (Year: 1979).*
Lin et al. "Application of Fe-based metallic glasses in wastewater treatment" Materials Science and Engineering B—vol. 177. Online Sep. 2011 pp. 92-95 (Year: 2011).*
I. Paseka, et al., "Hydrogen evolution and hydrogen sorption on amorphous smooth Me-P(x) (Me = Ni, Co, and Fe-Ni electrodes", Electrochimca Acta, 42(2) p. 237-242, Jan. (Year: 1997).*

* cited by examiner

*Primary Examiner* — J. Christopher Ball
(74) *Attorney, Agent, or Firm* — Tsz Lung Yeung (57) ABSTRACT

An iron-based amorphous electrode material for industrial wastewater treatment, wherein the material is amorphous alloy used as an electrode for electrochemical degradation of industrial wastewater, and the atom percentage of iron element in the alloy being 40-84%, wherein a method for treating dye wastewater by using the iron-based amorphous electrode material and a use of the iron-based amorphous electrode material in the electrochemical degradation of industrial wastewater are also disclosed.

13 Claims, 5 Drawing Sheets

IRON-BASED AMORPHOUS ELECTRODE MATERIAL FOR WASTEWATER TREATMENT AND USE THEREOF

BACKGROUND OF THE PRESENT INVENTION

Field of Invention

The invention relates to an iron-based amorphous alloy material and an application thereof, and in particular to an iron-based amorphous alloy used as an electrode material for electrochemical wastewater treatment and its application in the field of industrial wastewater treatment.

Description of Related Arts

With the rapid development of industry, the types and quantities of discharged wastewater have increased rapidly, and the pollution of water bodies has become increasingly widespread and badly, which has seriously threatened human health and safety. Therefore, industrial wastewater treatment is more important than urban sewage treatment for environmental protection and sustainable development. At present, the treatment methods for refractory industrial wastewater mainly include physical methods, biological methods and chemical methods. The physical method mainly includes adsorption method, flocculation method, ultrafiltration method, etc. However, due to the non-renewable and expensive price of the adsorbent, the large dosage of the flocculant added and the huge number of sludge generated by the flocculation method, the separation difficulties of the ultrafiltration method, and the like, the physical method is not considered as a good choice. Moreover, the physical method only collects pollutants and does not achieve the purpose of truly degrading pollutants. The biological method can utilize microbial enzymes to degrade pollutant molecules, especially organic pollutant molecules, but the microorganisms are harsh on the external environment, such as nutrients, temperature, pH, etc., and they have weak resistance in defending wastewater having complex components, high concentration of pollutants, and toxicity. Electrochemical treatment technology has the advantages of high degradation efficiency, low secondary pollution, simple operation and so on, which can be used as an environmentally friendly treatment process in industrial wastewater degradation. According to the principle of pollutant degradation, it can be subdivided into electrochemical redox, electrocoagulation, electrical floatation, photoelectrochemical oxidation, and internal electrolysis. However, high energy consumption, severe electrode loss, and poor stability have become common problems that restrict the industrial wastewater treatment by electrochemical technology. Therefore, electrode material technology is one of the keys to solve the above problems. The development of electrode materials with high stability, high corrosion resistance and high electrocatalytic activity is urgently needed to promote the wide application of such technologies.

The long-range disorder and short-range order structure and the high energy state of amorphous alloys give itself excellent chemical and catalytic properties, and at the same time, the amorphous alloys have higher corrosion resistance than crystalline alloys due to the uniformity of the composition thereof. It has been reported in the literature that the iron-based amorphous alloy ribbon is placed in the dye wastewater as an internal electrolytic material, and evenly stirred, a decolorization effect is achieved. Compared with the traditional zero-valent iron method, the decolorization efficiency of the iron-based amorphous alloy is significantly improved. However, focused on the actual application, the relatively low processing efficiency and large mass loss of iron-based amorphous alloys are still main issues to be solved. How to give full play to the performance advantages of iron-based amorphous alloys and develop an efficient, stable and low-cost industrial wastewater treatment technology is an urgent problem to be solved.

SUMMARY OF THE PRESENT INVENTION

The object of the present invention is to provide a method for efficiently degrading industrial wastewater by using an iron-based amorphous alloy material as an electrode material, and the iron-based amorphous alloy ribbon as an electrode has good stability in electrochemical degradation of industrial wastewater, achieve high degradation efficiency of industrial wastewater, and also greatly reduces electricity consumption, at the same time.

The technical solution of the present invention is as follows:

An iron-based amorphous electrode material for wastewater treatment, characterized in that, the material is an iron-based amorphous alloy, and is used as an electrode for electrochemically degrading industrial wastewater, wherein the atomic percentage of iron element in the alloy is 40%~84%, preferably 65%~84%, and the most preferable range is 70%~84%. Other alloying elements are preferably one or more elements selected from the group consisting of Si, B, P, C, Mo, Nb, Cu, Ni, and Co.

A method for degrading industrial wastewater by using an iron-based amorphous alloy, characterized in that, utilizing an iron-based amorphous alloy ribbon as an electrode for electrochemically degrading industrial wastewater (preferably dye wastewater), wherein the electrode has a potential of 0~5V and a current of 0.005 A~1 A. The atomic percentage of iron in the alloy is 40%~84%, preferably 65%~84%, and most preferably 70%~84%.

The iron-based amorphous alloy ribbon is prepared by melt spinning method and has a thickness of 15 μm–100 μm.

The specific surface area concentration of the iron-based amorphous alloy ribbon in the dye wastewater solution is greater than 100 cm2/(g·L).

The concentration of the dye wastewater solution is 20 mg/L~2000 mg/L, the solution temperature is ambient temperature to 100° C., the pH of the solution is 1~12.

In the method for degrading dye wastewater by the iron-based amorphous alloy, the dye wastewater is stirred by a stirrer at a speed of 100 rpm~800 rpm.

Compared with a conventional metal electrode, such as aluminum electrode or iron electrode, and a conventional metal oxide electrode, such as PbO2 electrode, the present invention has the following advantages:

1. The iron-based amorphous alloy ribbon of the present invention is used as the electrode for electrochemically degrading the azo dye, which not only can achieve high degradation efficiency of the wastewater, but also can greatly reduce energy consumption.

2. The iron-based amorphous alloy ribbon has good stability and wide application range in degrading dye wastewater.

3. The uniformity of the composition of the iron-based amorphous alloy greatly reduces the corrosion rate of iron. The ribbons after participating in the degradation of dye wastewater can still maintain the amorphous structure, and the quality loss of the electrode is small, which provides a guarantee for recycling and reuse, and prolongs the service life of the electrode.

4. The iron-based amorphous alloy involved in the present invention has a wide range of sources. With the widespread use of amorphous transformers, iron-based amorphous alloy ribbons have, and will have more waste, including defective products produced during the processing of ribbon-casting and preparation of transformers, and waste products produced after the transformer has reached the end of its useful life. And applying these discarded ribbons for the electrochemical degradation of dye wastewater can achieve the benefits of using waste to treat waste. Not only the price is cheap, but it can also realize the integration and utilization of waste energy and source.

5. The electrochemical degradation process for dye wastewater, which is provided by the invention, is simple to operate, low in production cost and has a good application prospect.

DETAILED DESCRIPTION OF THE PREFERRED EMBODIMENT

The present invention prepares an iron-based amorphous alloy ribbon by utilizing a ribbon-casting method, which is mainly concentrated in an alloy system of Fe—B, Fe—Si—B, Fe—Co—Si—B, Fe—Ni—Si—B, Fe—Si—B—P, Fe—Si—B—Mo, Fe—Si—B—Nb, Fe—Si—B—P—Cu, Fe—Si—B—Nb—Cu, Fe—B—C, Fe—B—C—Nb, Fe—B—C—Cu, Fe—P—C, Fe—P—C—Cu and so on, and its typical nominal composition (atomic %), such as: $Fe_{83}B_{17}$, $Fe_{78}Si_8B_{14}$, $Fe_{65}Co_{13}Si_8B_{14}$, $Fe_{40}Co_{38}Si_8B_{14}$, $Fe_{68}Ni_{10}Si_8B_{14}$, $Fe_{50}Ni_{28}Si_8B_{14}$, $Fe_{83}B_{10}Si_4P_3$, $Fe_{77}Si_8B_{14}Mo_1$, $Fe_{74.5}Nb_3Si_{13.5}B_9$, $Fe_{83}Si_4B_{10}P_2Cu_1$, $Fe_{73.5}Nb_3Cu_1Si_{13.5}B_9$, $Fe_{84}B_{10}C_6$, $Fe_{83}Nb_1B_{10}C_6$, $Fe_{83.5}Cu_{0.5}B_{10}C_6$, $Fe_{84}P_{10}C_6$, $Fe_{83.25}P_{10}C_6Cu_{0.75}$, etc., and they are applied to the electrochemical degradation test of dye wastewater, and the test results show that an electrode of the iron-based amorphous alloy ribbon has a good stability, a high degradation efficiency and greatly reduces electricity consumption, during the electrochemical degradation of the dye wastewater.

Figure 1:
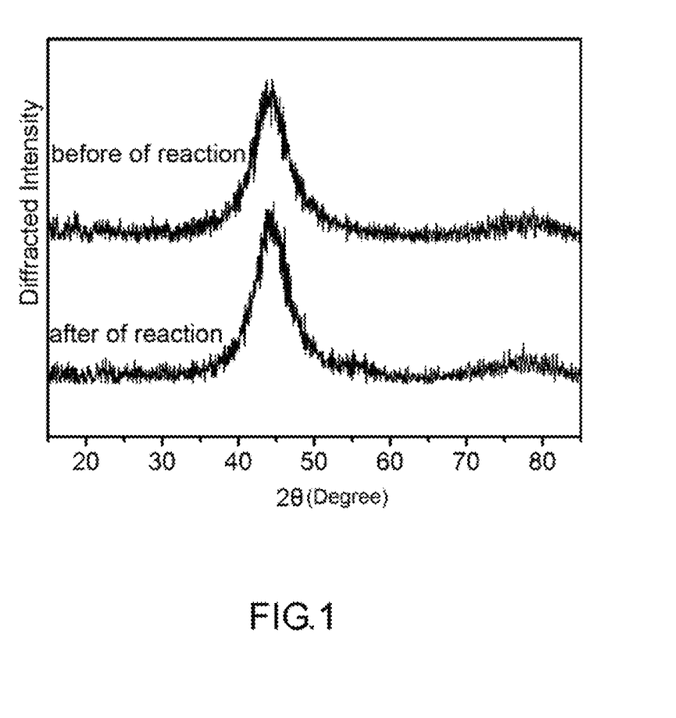
FIG. 1 shows the XRD patterns of an iron-based amorphous alloy $Fe_{73.5}Nb_3Cu_1Si_{13.5}B_9$ (at. %) ribbon, before and after reaction of degrading an acidic orange II solution.

FIG. 1 shows the XRD patterns of the iron-based amorphous alloy $Fe_{73.5}Nb_3Cu_1Si_{13.5}B_9$ (at. %) ribbon, before and after reaction, and there is no distinctive difference between the XRD patterns of the ribbon before and after reaction, wherein the dispersion peaks illustrate the amorphous structures of the samples.

The iron-based amorphous alloy ribbon is applied for electrochemically degrading the acidic orange II solution, by utilizing it as an electrode, wherein the surface area of the electrode participating in the reaction is 50 cm², the concentration of the acidic orange II solution is 0.2 g/L, and the volume of the acidic orange II solution is 300 mL. Placing the beaker containing the acidic orange II solution in an electromagnetic stirring system, and then stirring the dye solution at a speed of 200 rpm, wherein the temperature is controlled at 60° C. The test is performed by selecting electrode voltages of 0.5V and 1V, respectively. After the start of the reaction, about 3 mL solution is taken at intervals to detect ultraviolet-visible absorption spectroscopy thereof. According to the spectroscopy knowledge, the maximum absorption peak of the acidic orange II solution is 484 nm, which represents its azo structure (—N=N—). The corresponding absorbance is proportional to the solubility of the solution, so the change of the solution solubility of the acidic orange II solution can be obtained by the change of the absorbance of the solution solubility of the acidic orange II solution at the maximum absorption peak. The comparison test is carried out when the electrode is under an open state thereof. In addition, when the electrode voltage is 0.5V, a high-purity iron foil is selected as the electrode for perform the comparison test.

Figure 2:
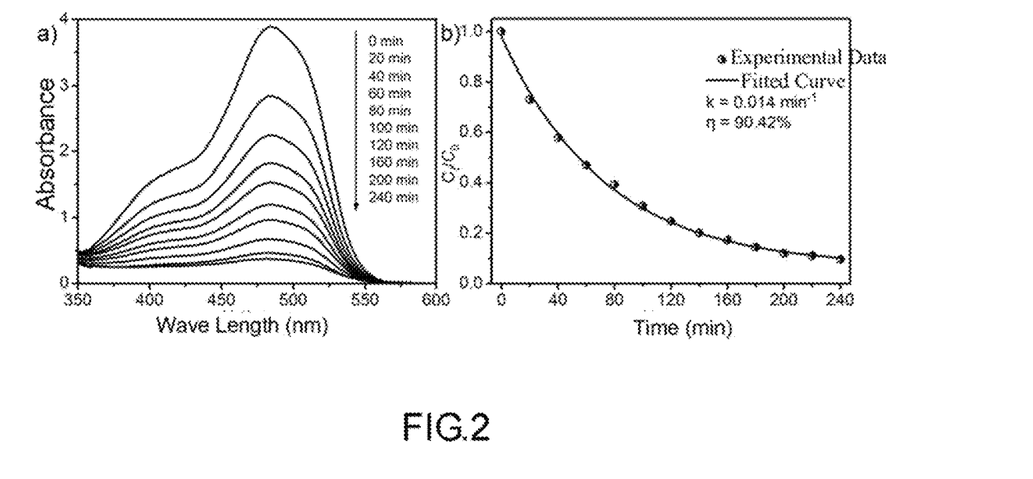
FIG. 2 is a graph showing the time variation of the UV-visible absorption spectrum of an acidic orange II solution, and the time variation of $C_t/C_0$ of the acidic orange II solution, under the electrochemical degradation of the iron-based amorphous alloy $Fe_{73.5}Nb_3Cu_1Si_{13.5}B_9$ (at. %) ribbon, wherein the electrode voltage is 0.5V and the solution temperature is 60° C.

FIG. 2 is a graph showing the time variation of the UV-visible absorption spectrum of the acidic orange II solution, under the electrochemical degradation of the iron-based amorphous alloy $Fe_{73.5}Nb_3Cu_1Si_{13.5}B_9$ (at. %) ribbon. As shown in FIG. 2a, the electrode voltage is 0.5V. As the reaction time increases, the absorbance of the acidic orange II solution, at 484 nm, gradually decreases, which means that the azo bond (—N=N—) is continuously broken and the acid orange II is continuously degraded. FIG. 2a shows the kinetic curve of degradation of the acid orange II. After nonlinear fitting, it is found that the degradation process satisfies the pseudo first-order reaction:

$C_t/C_0 = (1-C_{ult}/C_0) \exp(-kt) + C_{ult}/C_0$, wherein $C_t$ represents the solution concentration at time t, and Co represents the solution concentration at the initial time, $C_{ult}$ represents the final residual solution concentration, t represents the reaction time, t represents the reaction time, k represents the reaction rate constant, and the degradation efficiency $\eta = 1 - C_{ult}/C_0$.

When the electrode voltage is 0.5V and the reaction time is 240 min, the degradation efficiency of the acidic orange II solution can reach 90.42%, and the rate constant obtained by fitting is 0.014 $min^{-1}$. The calculated electrical energy consumption is 40.76 J, the electrical energy consumption per unit of degradation efficiency is 0.45 J/%, and the mass loss of the electrode is 16 mg. As a comparison, a high-purity iron foil is used as the electrode, and when the other experimental conditions are the same and the reaction time is 120 min, the degradation efficiency of the acidic orange II solution can reach 98.06%, the energy consumption is 91.65 J, and the electrical energy consumption per unit of degradation efficiency is 0.94 J/%, the mass loss of the electrode is 60 mg. In the experiment, the high-purity iron foil and the iron-based amorphous alloy ribbon have the same surface area, and the thickness of the iron foil (100 μm) is three times that of the iron-based amorphous alloy ribbon (30 μm), and the iron-based amorphous alloy contains a large amount of non-metallic elements. Therefore, the iron content per unit surface area of the iron-based amorphous alloy ribbon is much less than that of the high-purity iron foil. However, when the iron-based amorphous alloy ribbon is used as the electrode, the degradation efficiency of the acidic orange II can also be more than 90%. So to speak, the iron content per unit of the iron-based amorphous alloy ribbon as the electrode is more effective in degrading the acid orange II solution than that of the high-purity iron foil. Moreover, when the high-purity iron foil is used as the electrode, the energy consumption and mass loss of the electrode far exceeds that of the iron-based amorphous alloy ribbon as the electrode. Thus it can be seen that the iron-based amorphous alloy ribbon is used as the electrode for electrochemically degrading the acidic orange II solution, it has the advantages of high degradation efficiency, less electrode loss, long electrode life and low energy consumption, with respect to the high-purity iron foil.

Figure 3:
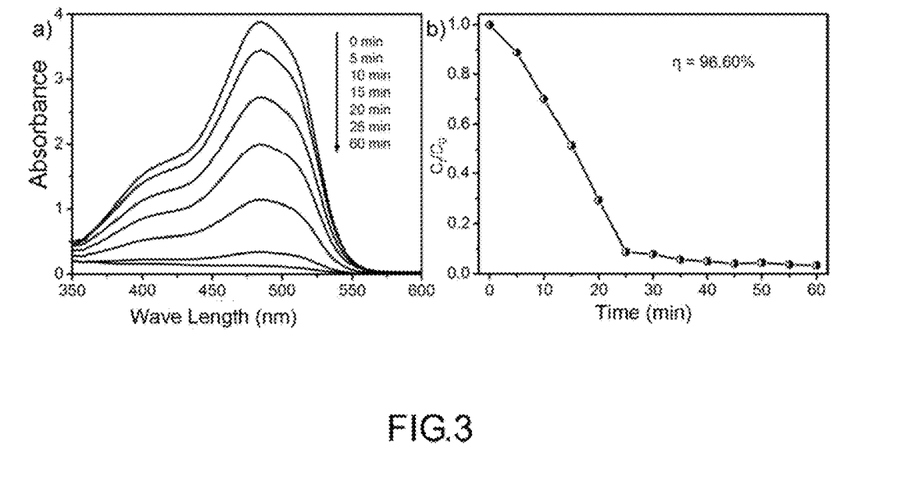
FIG. 3 is a graph showing the time variation of the UV-visible absorption spectrum of the acidic orange II solution, and the time variation of $C_t/C_0$ of the acidic orange II solution, under the electrochemical degradation of the iron-based amorphous alloy $Fe_{73.5}Nb_3Cu_1Si_{13.5}B_9$ (at. %) ribbon, wherein the electrode voltage is 1V and the solution temperature is 60° C.

FIG. 3 shows the degradation process of the acidic orange II solution, when the electrode voltage is increased to 1V, under the electrochemical degradation of the iron-based amorphous alloy $Fe_{73.5}Nb_3Cu_1Si_{13.5}B_9$ (at. %) ribbon, wherein when the reaction time is 30 min, the degradation efficiency can reach 92.67%, and when the reaction time is 60 min, the degradation efficiency can reach 96.60%. Thus it can be seen that a certain increase of the electrode voltage is helpful to the degradation of the acidic orange II solution.

Figure 4:
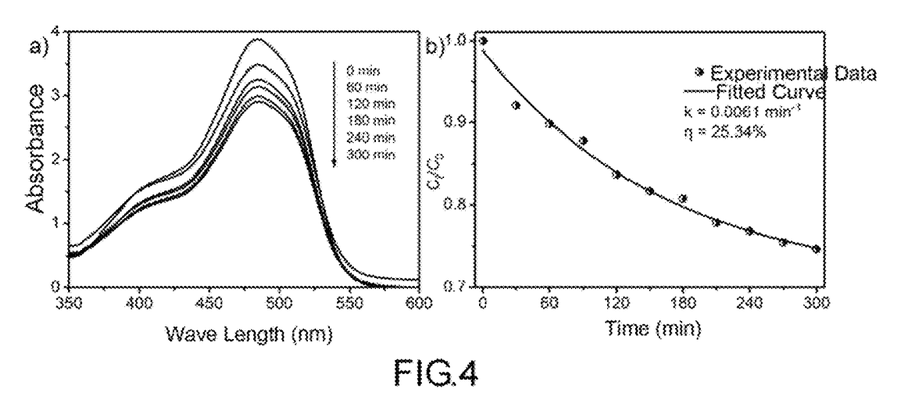
FIG. 4 is a graph showing the time variation of the UV-visible absorption spectrum of the acidic orange II solution and the time variation of $C_t/C_0$ of the acidic orange II solution, under the electrochemical degradation of the iron-based amorphous alloy $Fe_{73.5}Nb_3Cu_1Si_{13.5}B_9$ (at. %) ribbon, wherein the electrode voltage is 0V and the solution temperature is 60° C.

FIG. 4 shows the degradation of the acidic orange II solution, when the electrode of the iron-based amorphous alloy $Fe_{73.5}Nb_3Cu_1Si_{13.5}B_9$ (at. %) ribbon is under an open state. It can be seen that the acid orange II is slowly degraded in the absence of electrochemical action. When the reaction time is 30 min, the degradation efficiency is only 25.34%, and the reaction rate constant is 0.006 $min^{-1}$. It can be seen that the reaction rate and degradation efficiency of the iron-based amorphous alloy ribbon is far greater than that without electricity, under electrochemical action, when it is used for degrading the acidic orange II solution.

Figure 5:
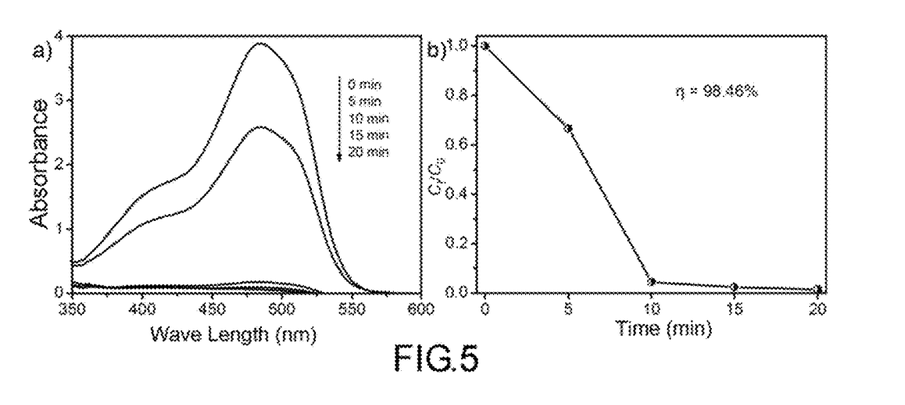
FIG. 5 is a graph showing the time variation of the UV-visible absorption spectrum of the acidic orange II solution and the time variation of $C_t/C_0$ of the acidic orange II solution, under the electrochemical degradation of the iron-based amorphous alloy $Fe_{78}Si_8B_{14}$ (at. %) ribbon, wherein the electrode voltage is 1V and the solution temperature is 60° C.

FIG. 5 shows the degradation process of the acidic orange II solution, when the electrode voltage is increased to 1V, under the electrochemical degradation of the iron-based amorphous alloy $Fe_{78}Si_8B_{14}$ (at. %) ribbon, wherein when the reaction time is 10 min, the degradation efficiency can reach 95.47%, and when the reaction time is 20 min, the degradation efficiency can reach 98.46%. Thus it can be seen that the degradation rate of acid orange II is accelerated, with the increase of Fe content in the iron-based amorphous alloy.

In the following examples, the surface area of the electrode participating in the reaction is 5 $cm^2$, the volume of the acidic orange II solution is 300 mL, and other conditions are unchanged.

Figure 6:
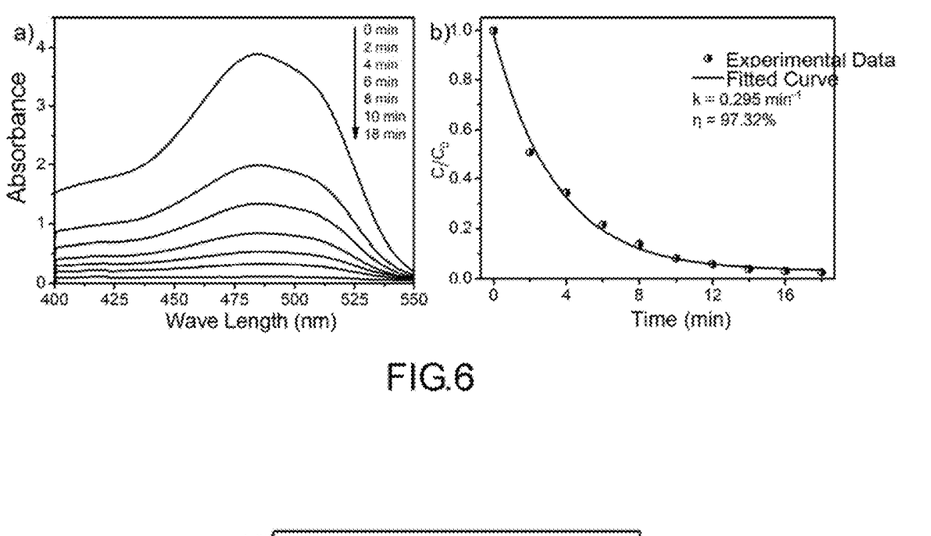
FIG. 6 is a graph showing the time variation of the UV-visible absorption spectrum of the acidic orange II solution and the time variation of $C_t/C_0$ of the acidic orange II solution, under the electrochemical degradation of the iron-based amorphous alloy $Fe_{83}Si_4B_{10}P_2Cu_1$ (at. %) ribbon, wherein the electrode voltage is 1V and the solution temperature is 60° C.
Figure 7:
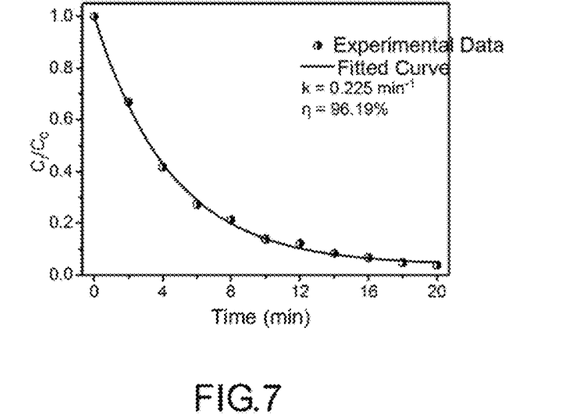
FIG. 7 is a graph showing the time variation of $C_t/C_0$ of the acidic orange II solution, under the electrochemical degradation of the iron-based amorphous alloy $Fe_{65}Co_{13}Si_8B_{14}$ (at. %) ribbon, wherein the electrode voltage is 1V and the solution temperature is 60° C.
Figure 8:
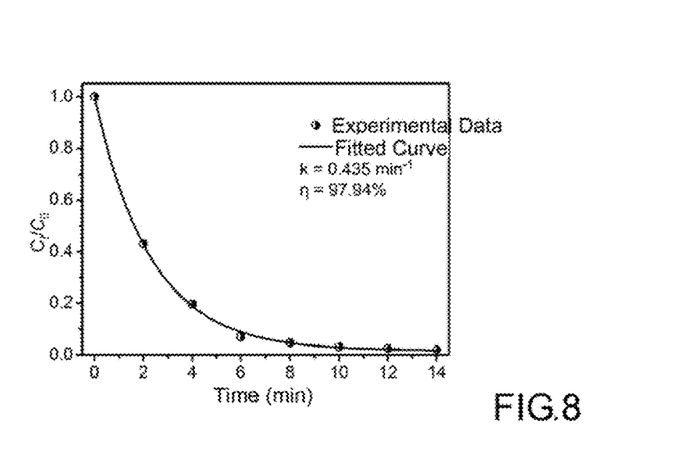
FIG. 8 is a graph showing the time variation of $C_t/C_0$ of the acidic orange II solution, under the electrochemical degradation of the iron-based amorphous alloy $Fe_{40}Co_{38}Si_8B_{14}$ (at. %) ribbon, wherein the electrode voltage is 1V and the solution temperature is 60° C.

FIG. 6 shows the degradation process of the acidic orange II solution under the electrochemical degradation of the iron-based amorphous alloy $Fe_{83}Si_4B_{10}P_2Cu_1$ (at. %) ribbon, wherein when the reaction time is 18 min, the degradation efficiency can reach 97.32%, and the reaction rate constant is 0.295 $min^{-1}$. FIG. 7 shows the degradation process of the acidic orange II solution under the electrochemical degradation of the iron-based amorphous alloy $Fe_{65}Co_{13}Si_8B_{14}$ (at. %) ribbon, wherein when the reaction time is 20 min, the degradation efficiency can reach 96.19%, and the reaction rate constant is 0.225 $min^{-1}$. FIG. 8 shows the degradation process of the acidic orange II solution under the electrochemical degradation of the iron-based amorphous alloy $Fe_{40}Co_{38}Si_8B_{14}$ (at. %) ribbon, wherein when the reaction time is 14 min, the degradation efficiency can reach 97.94%, and the reaction rate constant is 0.435 $min^{-1}$. It can be seen that the small addition of Co in the Fe-based amorphous alloy does not significantly affect the degradation effect, while the increase of the content of Co accelerates the rate of electrochemical degradation of the iron-based amorphous alloy ribbon.

Figure 9:
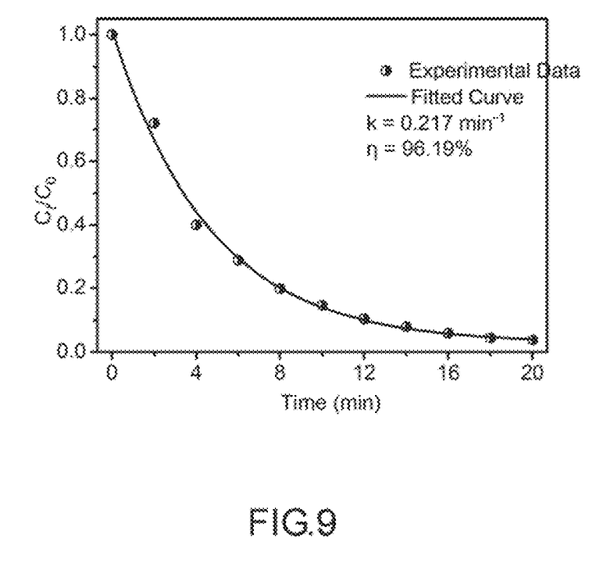
FIG. 9 is a graph showing the time variation of $C_t/C_0$ of the acidic orange II solution, under the electrochemical degradation of the iron-based amorphous alloy $Fe_{68}Ni_{10}Si_8B_{14}$ (at. %) ribbon, wherein the electrode voltage is 1V and the solution temperature is 60° C.
Figure 10:
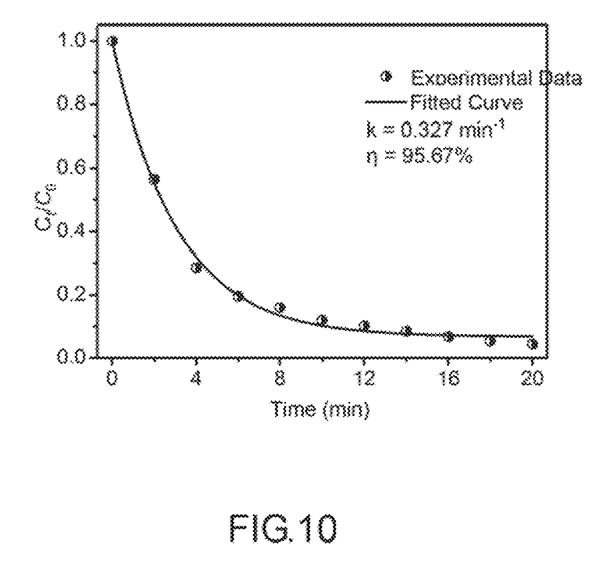
FIG. 10 is a graph showing the time variation of $C_t/C_0$ of the acidic orange II solution, under the electrochemical degradation of the iron-based amorphous alloy $Fe_{50}Ni_{28}Si_8B_{14}$ (at. %) ribbon, wherein the electrode voltage is 1V and the solution temperature is 60° C.

Similar to the Co element, the addition of a small amount of Ni in the Fe-based amorphous alloy has no significant effect on the degradation, and as the content of Ni increases, the rate of electrochemical degradation of the acidic orange II solution by the iron-based amorphous alloy ribbon accelerates, as shown in FIG. 9 and FIG. 10. FIG. 9 shows the degradation of the acidic orange II solution under the electrochemical degradation of the iron-based amorphous alloy $Fe_{68}Ni_{10}Si_8B_{14}$ (at. %) ribbon, wherein when the reaction time is 20 min, the degradation efficiency can reach 96.19%, and the reaction rate constant is 0.217 $min^{-1}$. FIG. 10 shows the degradation of the acidic orange II solution under the electrochemical degradation of the iron-based amorphous alloy $Fe_{50}Ni_{28}Si_8B_{14}$ (at. %) ribbon, wherein when the reaction time is 20 min, the degradation efficiency can reach 95.67%, and the reaction rate constant is 0.327 $min^{-1}$.

Figure 11:
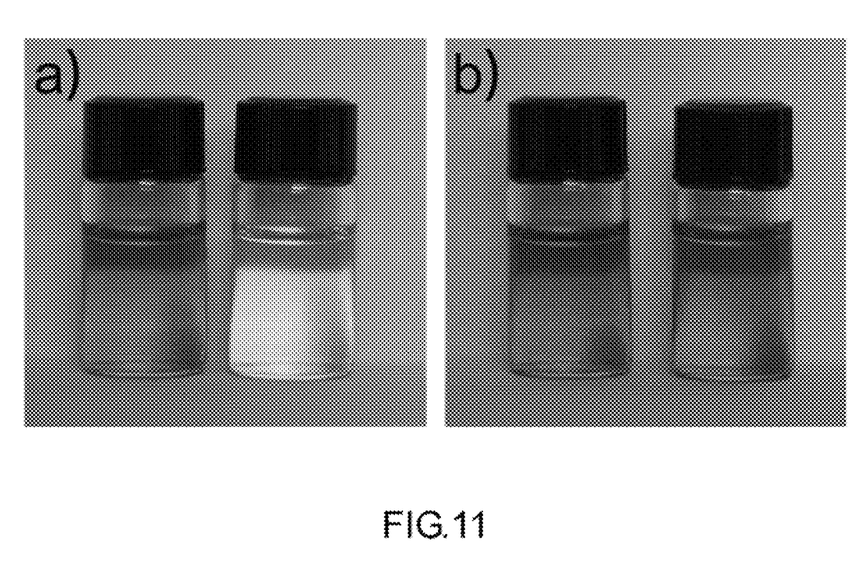
FIG. 11 is two photographs showing respectively the acid orange II solution samples before and after reaction, under the degradation of $Fe_{73.5}Nb_3Cu_1Si_{13.5}B_9$ ribbon, wherein the electrode voltages is respectively 1V and 0V.

FIG. 11 provides two sample photographs of the acid orange II solution before and after reaction, under the electrochemical degradation of the iron-based amorphous alloy $Fe_{73.5}Nb_3Cu_1Si_{13.5}B_9$ ribbon, when the electrode voltages are 1V and 0V, respectively. It can be seen that when the acid orange II solution is under the action of electrochemistry and the reaction time is 60 min, the acid orange II solution is changed from the initial orange-red color to a colorless, and when the reaction is performed for 300 min without the electrochemical action, the color of the solution nearly remains unchanged.

In order to further illustrate the technological advancement of the present invention, the following comparative examples are supplemented:

Comparative Example 1

The technical solution is basically the same as the above embodiments, and the composition of the iron-based amorphous alloy is $Fe_{78}Si_8B_{14}$ (at. %), wherein the differences is that the present example does not apply current and voltage, and the remaining technical details are the same as the above embodiments. The test results show that it takes 120 min to effectively degrade the azo dye, and the decolorizing efficiency is 96.09%. Obviously, by comparison, it can be found that the decoloring effect of the technical solution of the present invention is greatly enhanced.

Comparative Example 2

The reaction is performed by utilizing a high-purity iron foil and an iron-based amorphous alloy $Fe_{78}Si_8B_{14}$ (at. %) ribbon as the electrodes, the voltages are 0.5V, and the other experimental conditions are the same. When the reaction time is 120 min and the high-purity iron foil is used as the electrode, the degradation efficiency of the acidic orange II solution can reach 98.06%, the electric energy consumption is 91.65 J, the electric energy consumption per unit degradation efficiency is 0.94 J/%, and the mass loss of the electrode is 60 mg; When the iron-based amorphous alloy $Fe_{78}Si_8B_{14}$ (at. %) ribbon is used as the electrode, the degradation efficiency of the acidic orange II solution can reach 98.35%, the electrical energy consumption per unit degradation efficiency is 0.66 J/%, and the mass loss of the electrode is 21 mg. It can be seen that compared with the high-purity iron foil, when the iron-based amorphous alloy ribbon is used as an electrode for electrochemically degrading the acidic orange II solution, it has the advantages of high degradation efficiency, low electrode loss, long electrode life and low electric energy consumption.

The above embodiments are only intended to illustrate the technical concept and the features of the present invention, and the purpose of the present invention is to enable those skilled in the art to understand the contents of the present invention and to implement the present invention. Equivalent changes or modifications made in accordance with the spirit of the invention are intended to be included within the scope of the invention.

What is claimed is:

1. An iron-based amorphous electrode for industrial wastewater treatment, wherein the iron-based amorphous electrode is made of an iron-based amorphous alloy, wherein the iron-based amorphous electrode defines a ribbon, wherein the atomic percentage of iron element in the iron-based amorphous alloy is 65% to 84%, and the remaining alloying element is one or more elements selected from the group consisting of P, C, Mo, Ni and Co.

2. An iron-based amorphous electrode for industrial wastewater treatment, wherein the iron-based amorphous electrode is made of an iron-based amorphous alloy, wherein the atomic percentage of iron element in the iron-based amorphous alloy is 40% to 84%, wherein the iron-based amorphous electrode defines a ribbon, and the remaining alloying element is one or more elements selected from the group consisting of P, C, Mo, Ni and Co.

3. An iron-based amorphous electrode for industrial wastewater treatment, wherein the iron-based amorphous electrode is made of an iron-based amorphous alloy, wherein the atomic percentage of iron element in the iron-based amorphous alloy is 40% to 84%, wherein the iron-based amorphous electrode defines a ribbon, wherein the iron-based amorphous electrode is made of one or more iron-based amorphous alloys selected from the group consisting of $Fe_{83}Si_4B_{10}P_2Cu_1$ (at. %), $Fe_{65}Co_{13}Si_8B_{14}$ (at. %), $Fe_{40}Co_{38}Si_8B_{14}$ (at. %), $Fe_{68}Ni_{10}Si_8B_{14}$ (at. %) and $Fe_{50}Ni_{28}Si_8B_{14}$ (at. %).

4. A method for treating industrial wastewater, comprising the following steps:
   putting an iron-based amorphous electrode into the industrial wastewater, wherein the iron-based amorphous electrode is made of an iron-based amorphous alloy, wherein the atomic percentage of iron element in the iron-based amorphous alloy is 40% to 84%;
   applying a potential to the iron-based amorphous electrode, wherein the potential is 0 to 5V and controlling the current flowing through the iron-based amorphous electrode to be 0.005A to 1A; and
   maintaining the temperature of the industrial wastewater at ambient temperature to 100° C.

5. The method for treating industrial wastewater, as recited in claim 4, further comprising the following step:
   adjusting the pH of the industrial wastewater at 1~12.

6. The method for treating industrial wastewater, as recited in claim 4, further comprising the following step:
   stirring the industrial wastewater by a stirrer at a speed of 100 rpm~800 rpm.

7. The method for treating industrial wastewater, as recited in claim 5, further comprising the following step:
   stirring the industrial wastewater by a stirrer at a speed of 100 rpm~800 rpm.

8. The method for treating industrial wastewater, as recited in claim 4, wherein the iron-based amorphous electrode defines a ribbon.

9. The method for treating industrial wastewater, as recited in claim 8, wherein the ribbon has a thickness of 15 μm–100 μm.

10. The method for treating industrial wastewater, as recited in claim 4, wherein the atomic percentage of iron element in the iron-based amorphous alloy is 70% to 84%, and the remaining alloying element is one or more elements selected from the group consisting of P, C, Mo, Ni and Co.

11. The method for treating industrial wastewater, as recited in claim 4, wherein the iron-based amorphous electrode is made of one or more iron-based amorphous alloys selected from the group consisting of $Fe_{83}Si_4B_{10}P_2Cu_1$ (at. %), $Fe_{65}Co_{13}Si_8B_{14}$ (at. %), $Fe_{40}Co_{38}Si_8B_{14}$ (at. %), $Fe_{68}Ni_{10}Si_8B_{14}$ (at. %) and $Fe_{50}Ni_{28}Si_8B_{14}$ (at. %).

12. The method for treating industrial wastewater, as recited in claim 5, wherein the iron-based amorphous electrode is made of one or more iron-based amorphous alloys selected from the group consisting of $Fe_{83}Si_4B_{10}P_2Cu_1$ (at. %), $Fe_{65}Co_{13}Si_8B_{14}$ (at. %), $Fe_{40}Co_{38}Si_8B_{14}$ (at. %), $Fe_{68}Ni_{10}Si_8B_{14}$ (at. %) and $Fe_{50}Ni_{28}Si_8B_{14}$ (at. %).

13. The method for treating industrial wastewater, as recited in claim 6, wherein the iron-based amorphous electrode is made of one or more iron-based amorphous alloys selected from the group consisting of $Fe_{83}Si_4B_{10}P_2Cu_1$ (at. %), $Fe_{65}Co_{13}Si_8B_{14}$ (at. %), $Fe_{40}Co_{38}Si_8B_{14}$ (at. %), $Fe_{68}Ni_{10}Si_8B_{14}$ (at. %) and $Fe_{50}Ni_{28}Si_8B_{14}$ (at. %).

* * * * *